United States Patent [19]

Pitner

[11] 3,717,394
[45] Feb. 20, 1973

[54] SEALING DEVICE FOR A BEARING MOUNTED ON A SHAFT
[75] Inventor: Alfred Pitner, Paris, France
[73] Assignee: Nadella, Rueil Malmaison, France; a part interest
[22] Filed: Oct. 5, 1970
[21] Appl. No.: 77,910

[30] Foreign Application Priority Data
Oct. 28, 1970 France.................................6936995

[52] U.S. Cl......................308/187.1, 64/17, 277/183
[51] Int. Cl..............................................F16c 33/78
[58] Field of Search......308/187.1, 36.1; 277/88, 94, 277/183, 208; 64/17 A

[56] References Cited
UNITED STATES PATENTS

| 3,457,732 | 7/1969 | Decouzon | 277/58 X |
|---|---|---|---|
| 3,447,848 | 6/1969 | Pitner | 308/187.2 |
| 3,479,100 | 11/1969 | Pitner | 308/187.2 |
| 3,363,952 | 1/1968 | Paterson | 308/187.1 |
| 2,773,366 | 12/1956 | Slaght | 64/17 A |
| 3,479,840 | 11/1969 | Meyers | 64/17 A |

FOREIGN PATENTS OR APPLICATIONS

| 937,687 | 12/1955 | Germany | 308/187.1 |
|---|---|---|---|
| 1,021,211 | 12/1957 | Germany | 308/187.1 |
| 1,327,643 | 4/1963 | France | 308/187.1 |

Primary Examiner—Milton Kaufman
Assistant Examiner—Barry Grossman
Attorney—Robert E. Burns and Emmanuel J. Lobato

[57] ABSTRACT

An elastomer sealing ring between a rolling bearing ring having a flange and a shaft having a shoulder. The sealing ring is fixed to the bearing ring and extends axially into an annular space defined by the shaft and a collar which is fixed to the shaft and has a larger diameter than the sealing ring. The sealing ring is capable of being slid and radially compressed in the annular space.

10 Claims, 5 Drawing Figures

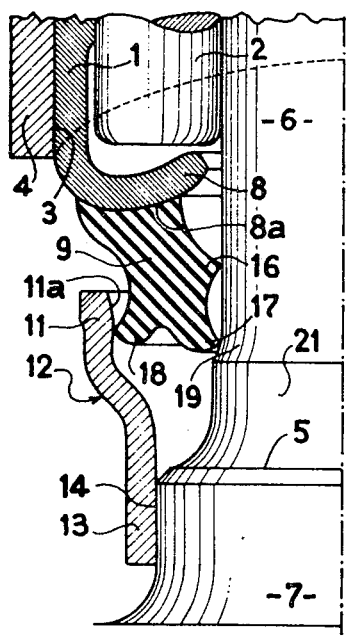
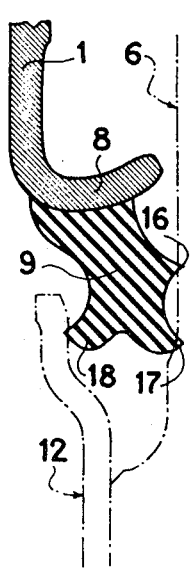
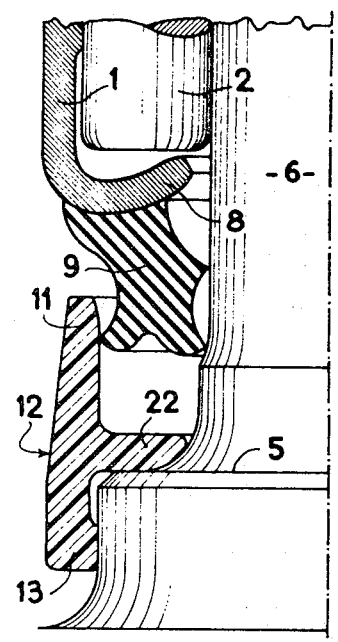
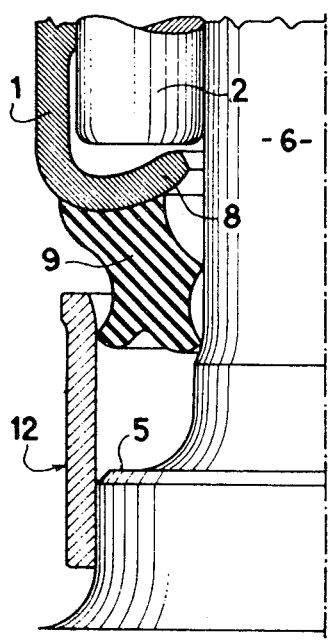
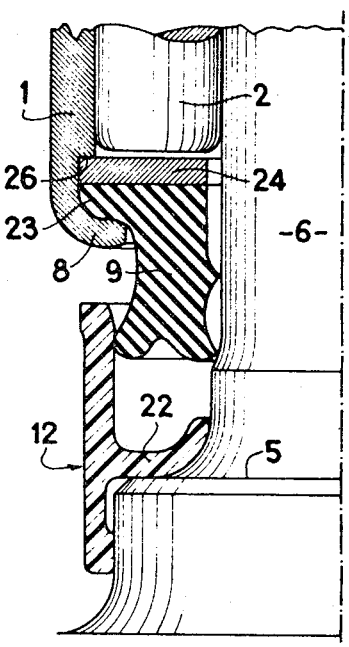

1

SEALING DEVICE FOR A BEARING MOUNTED ON A SHAFT

To achieve a seal between a needle bearing surrounding a shaft having a shoulder, as the trunnion of a cross member of a universal joint, there is currently employed a ring of elastomer which has a round section or a V-section and is axially compressed between the shoulder and a flange of the bearing ring.

When the sealing ring has a V-section it is also known to protect the lip of the ring by means of a cylindrical collar centered on the sealing ring.

An arrangement is also known which comprises fixing the elastomer ring on the bearing ring in the vicinity of or on the flange.

In the known arrangements just mentioned, the sealing of the bearing in fact results from a sliding contact between the relatively rotating parts which occurs only in an annular zone corresponding to the contact of the sealing ring with the flange of the bearing ring.

An object of the invention is to improve the known sealing devices so as to lower manufacturing costs and improve operational efficiency.

The invention provides a device for affording a seal between a shaft having a shoulder and a bearing surrounding the shaft and comprising a needle bearing ring having a flange adjacent the shoulder, by means of an elastomer sealing ring fixed to the bearing ring, wherein the sealing ring extends axially beyond the flange and is so combined with the face of the shaft and with a cylindrical collar of larger diameter fixed to the shaft, that the sealing ring can be axially introduced by sliding in the annular space between the shaft and the collar and thus be radially compressed in said space.

One of the advantages of this arrangement is that by providing, for example on the elastomer sealing ring, two lips in contact with the shaft and a lip in contact with the collar, three protecting zones are produced which must be passed through successively by the lubricant contained in the bearing if the lubricant is to escape to the exterior or by projections of exterior liquid if the latter is to enter the bearing. The seal is therefore particularly efficient.

Moreover, the fact that the compression ensuring the seal is radial, that is, in a direction in which the tolerances are easily respected, renders the seal independent of the manufacturing tolerances in the axial direction, which tolerances are liable to impair the quality of the seal in the case, for example, of a round-section sealing ring.

The collar can be of steel or plastics material.

The sealing ring can be fixed by vulcanization or adhesion or by a forming-over operation achieved by forming over the flange of the bearing ring and clamping the base of the sealing ring between the flange and a washer fixed in a groove formed inside the bearing ring.

Further features and advantages of the invention will be apparent from the ensuing description with reference to the accompanying drawing.

In the drawing:

FIG. 1 is a sectional view of one embodiment of the device affording a seal between a shaft and a bearing;

FIG. 2 is a partial view of the sealing ring shown in FIG. 1 in the free state;

FIGS. 3-5 are sectional views of other embodiments of the sealing device.

The illustrated sealing device affords a seal between a bearing ring 1, surrounding needles 2 and fitted in the bore 3 of a yoke 4 of a universal joint, and the trunnion 6 of the cross member 7 of the universal joint, the trunnion being capped by the ring 1.

The bearing ring 1 has a radial flange 8 for retaining the needles. On the outer face $8^a$ of the flange 8 there is vulcanized or adhered an elastomer sealing ring 9 which is radially compressed between the trunnion 6 and the cylindrical face 11 of large diameter of a collar 12. The latter has a cylindrical portion 13 of small diameter which is fixed on the cylindrical face 14 formed between the shoulder 5 of the cross member 7 and the center of the latter.

The sealing contact between the ring 9 and the cylindrical faces of the trunnion 6 and collar 12 occurs through two inner lips 16, 17 and an outer lip 18.

The elastomer sealing ring 9 has a certain amount of axial rigidity so that the sealing ring can be introduced between the collar 12 and the trunnion 6 by axially sliding the ring 1 along the trunnion in a movement which fits the bearing ring in the bore of the yoke 3. For this purpose, the cylindrical face 11 of the collar 12 has a conical chamfer $11^a$ on the inner edge thereof for guiding the outer lip 18 of the ring 9 and, as shown in FIG. 2, the radial dimension of the sealing ring, measured in the free state, between the inner lips 16, 17 and the outer lip 18 exceeds the radial distance between the corresponding faces of the trunnion 6 and collar 12.

It will be observed that the outer lip 17 in contact with the trunnion 6 is moreover compressed owing to the fact that it is applied in a zone 19 having a rounded sectional shape which is produced when the trunnion 6 is ground, the cast unmachined zone 21 connecting the trunnion to the shoulder 5 being adjacent the zone 19.

In FIG. 1, the collar 12 is of metal and in FIG. 3 the collar is of plastics material and has a radial rib 22 applied against the plane face of the shoulder 5.

In FIG. 4 the collar 12 is also of metal and has the same inside diameter throughout its length. The inside diameter varies in the embodiment shown in FIG. 1.

In FIG. 5, the collar 12 is also of plastics material. Further, the elastomer sealing ring 9, instead of being adhered to the flange 8, is retained by forming over the flange 8 which compresses a peripheral bead 23 of the sealing ring in contact with a washer 24 engaged in a groove or recess 26 formed in the inner face of the bearing ring 1.

Having now described my invention what I claim and desire to secure by Letters Patent is:

1. In a device affording a seal between a shaft having a substantially cylindrical face and a shoulder and a rolling bearing which surrounds the shaft and comprises needles and a bearing ring encompassing the needles and including a flange adjacent said shoulder, an elastomer sealing ring having a first annular portion, means fixing said first annular portion to said flange, the sealing ring extending axially beyond said flange, a cylindrical collar in spaced relation to said bearing ring and fixed to said shaft and having an inner face defining with the cylindrical face of the shaft an annular space, said sealing ring having a second annular portion located in said annular space, said second annular portion having in a free unstressed condition of said second annular portion prior to insertion in said annular space an overall radial size exceeding the radial size of said annular space so that said second annular portion is in a radially compressed condition between and in sealing contact with said inner face and said cylindrical face of the shaft.

2. A device as claimed in claim 1, wherein said shaft has a portion having a second cylindrical face having a diameter larger than the diameter of said cylindrical face of said shaft, said collar being fitted on said shaft portion having said second cylindrical face.

3. A device as claimed in claim 1, wherein said collar is of metal.

4. A device as claimed in claim 1, wherein said sealing ring adheres to an outer face of the flange of the bearing ring.

5. A device as claimed in claim 1, wherein said means fixing said first annular portion to said bearing ring comprises a formed-over integral portion of said bearing ring, a peripheral bead portion of said sealing ring, a groove inside said bearing ring, and a washer engaged in said groove, said bead portion being trapped and sealingly fixed between said washer and said formed-over integral portion of said bearing ring, and said collar being in axially spaced relation to the bearing ring and terminating in a region intermediate said first annular portion and said second annular portion of the sealing ring.

6. A device as claimed in claim 1, wherein said collar has a radial rib which bears axially against said shoulder and said sealing ring is in axially spaced relation to said radial rib.

7. In a device affording a seal between a shaft having a substantially cylindrical face and a shoulder and a rolling bearing which surrounds the shaft and comprises needles and a bearing ring encompassing the needles and including a flange adjacent said shoulder, an elastomer sealing ring having a first annular portion, means fixing said first annular portion to said flange, the sealing ring extending axially beyond said flange, a cylindrical collar in spaced relation to said bearing ring and fixed to said shaft and having an inner cylindrical face and defining with the shaft an annular space having a closed end remote from said bearing and an open end adjacent said bearing, the sealing ring having a second annular portion which is located in said annular space and is in axially spaced relation to said closed end of said annular space, said second annular portion comprising an outer annular lip portion in sealing contact with said inner cylindrical face of said collar and an inner annular lip portion in sealing contact with said cylindrical face of the shaft, the difference between the outside diameter of said outer annular lip portion and the inside diameter of said inner annular lip portion exceeding the difference between the diameter of said cylindrical face of the shaft and the diameter of the inner cylindrical face of the collar in a free unstressed condition of the second annular portion of the sealing ring before insertion of the second annular portion of the sealing ring in said annular space so that said second annular portion of the sealing ring is in a radially compressed condition between the collar and the shaft.

8. In a device affording a seal between a shaft having a substantially cylindrical face and a shoulder and a rolling bearing which surrounds the shaft and comprises needles and a bearing ring encompassing the needles and including a flange adjacent said shoulder, an elastomer sealing ring having a first annular portion, means fixing said first annular portion to said flange, the sealing ring extending axially beyond said flange, a cylindrical collar in spaced relation to said bearing ring and fixed to said shaft and having an inner face defining with the cylindrical face of the shaft an annular space, the sealing ring having a second annular portion located in said annular space, said second portion having an outer annular lip portion in sealing contact with said inner face, a first inner annular lip portion in sealing contact with said cylindrical face, a second inner annular lip portion located between said first inner lip portion and said first annular portion of the sealing ring and in sealing contact with said cylindrical face, the difference between the diameter of said outer annular lip portion and the diameters of said first inner annular lip portion and said second inner annular lip portion being, in a free unstressed condition of said second annular portion prior to insertion of said second annular portion in said annular space, greater than the difference between the diameter of said inner face of said collar and the diameter of said cylindrical face of the shaft so that said first annular lip portion and second annular lip portion are in a radially compressed condition, said first inner annular lip portion and said second inner annular lip portion defining an annular space with said cylindrical face of said shaft and said outer annular lip portion defining with said first inner annular lip portion an annular recess in said second annular portion of said sealing ring.

9. A structure comprising in combination: a branch of a yoke of a universal joint, an aperture in said branch, a cross element of the universal joint comprising a trunnion extending into said aperture, a rolling bearing interposed between said trunnion and said aperture and having an outer bearing ring having a radially inwardly extending end flange, a first annular member secured to said cross element and having an annular inner face and defining with said trunnion an annular cavity having a closed annular end and an open end which is adjacent said bearing, and an elastomer annular sealing member having a first annular portion secured to said flange and a second annular portion located in said annular cavity in axially spaced relation to said closed annular end, said second annular portion defining an inner annular lip in sealing contact with said trunnion and an outer annular lip in sealing contact with said inner face, said lips defining an intermediate annular groove and said lips and annular groove defining an end surface extending from said first annular member to said trunnion and facing said closed end of said cavity, the difference between the diameter of said outer annular lip and the diameter of said inner annular lip being, in a free unstressed condition of said second annular portion prior to insertion of said annular portion in said annular cavity, greater than the difference between the diameter of said inner face of said first annular member and the diameter of said trunnion so that said lips are in a radially compressed condition between said inner face and said trunnion.

10. A structure as claimed in claim 9, wherein one of said members has an annular chamfered end portion which facilitates the penetration of said sealing member in said first annular member upon axial location of said bearing between said aperture and trunnion upon assembly of said trunnion and said yoke branch.

* * * * *